United States Patent [19]

Kees, Jr.

[11] Patent Number: 4,476,628

[45] Date of Patent: Oct. 16, 1984

[54] APPARATUS AND METHOD FOR SPREADING WIRES IN A CABLE AND CONNECTING THE WIRES TO TERMINALS

[75] Inventor: Gerald H. Kees, Jr., Kernersville, N.C.

[73] Assignee: AMP Incorporated, Harrisburg, Pa.

[21] Appl. No.: 361,005

[22] Filed: Mar. 23, 1982

[51] Int. Cl.$^3$ ........................ H01R 43/04; B23P 19/00

[52] U.S. Cl. ........................................ 29/861; 29/749; 29/755; 81/9.51

[58] Field of Search ................. 29/749, 755, 861, 865, 29/866, 56.5, 760; 81/9.51; 174/88 R; 339/97 P, 99 R

[56] References Cited

U.S. PATENT DOCUMENTS

| | | | |
|---|---|---|---|
| 3,593,463 | 7/1971 | Gurley . | |
| 3,758,935 | 9/1973 | Long et al. | 29/203 |
| 3,760,331 | 9/1973 | Gurley | 339/97 P X |
| 3,845,535 | 11/1974 | Over et al. | 29/203 |
| 3,885,287 | 5/1975 | Long et al. | 29/203 |
| 4,075,758 | 2/1978 | Parsons et al. | 29/866 |
| 4,077,695 | 3/1978 | Bakermans | 29/760 X |
| 4,194,276 | 3/1980 | Grubb | 29/56.6 |

FOREIGN PATENT DOCUMENTS 2927401 8/1981 Fed. Rep. of Germany .

*Primary Examiner*—Howard N. Goldberg
*Assistant Examiner*—Carl J. Arbes
*Attorney, Agent, or Firm*—F. W. Raring

[57] ABSTRACT

Wire insertion apparatus for inserting wires in a flat cable into cavities of an electrical connector comprises a connector jig and a wire locating jig adjacent to the connector jig. The wire locating jig comprises a stack of side-by-side cable spreading and wire locating fingers. The cable, having its wires on closely spaced centers, is located adjacent to the connector and the stack of fingers is moved relatively towards the cable. The free ends of the fingers move relatively between the wires of the cable and spread the wires until they are in alignment with the cavities in the connector. Thereafter, the wires can be pushed into the cavities and inserted into slots in the terminals in the connector.

18 Claims, 15 Drawing Figures

APPARATUS AND METHOD FOR SPREADING WIRES IN A CABLE AND CONNECTING THE WIRES TO TERMINALS

FIELD OF THE INVENTION

This invention relates to mass wire insertion apparatus for inserting a plurality of wires into the wire receiving portions of terminals in a connector. The invention is particularly concerned with the insertion of wires in a flat cable into terminals in a connector where the center-to-center spacing of adjacent wires in the cable is less than the center-to-center spacing of the terminals in the connector.

BACKGROUND OF THE INVENTION

It is common practice to connect individual wires to terminals in an electrical connector by means of an insertion apparatus of the type shown in U.S. Pat. No. 3,758,935 which has a connector locating jig for locating the connector in a predetermined position, a wire locating jig for locating the wires with their axes extending transversely of the cavities in the connector, and an insertion means for pushing the wires laterally of their axes into the cavities in the connector and into the wire receiving slots of the terminals in the cavities. The principles of the mass insertion apparatus, as described in U.S. Pat. No. 3,758,935, have been used in cable making machines as shown, for example, in U.S. Pat. Nos. 4,043,034 and 4,235,015 and the same principles have been used in harness making apparatus of the general type shown in U.S. Pat. No. 4,194,276. It is advantageous to connect wires to terminals in a connector with a mass insertion apparatus for the reason that all of the wires are connected to all of the terminals in the connector in a single wire insertion operation which can be carried out by simply moving an insertion tool towards the wires and the connector.

The U.S. Patents noted above show wire insertion apparatus which can be used only with the discrete wires rather than wires in a flat cable. The discrete wires are simply placed in a wire jig or otherwise positioned in alignment with the connector cavities and thereafter pushed into the cavities. The operation of positioning the wires relative to the connector may be carried out manually, by robotics, or by feeding the wires to an insertion station as in U.S. Pat. Nos. 4,043,034 and 4,235,015.

Flat cable, rather than discrete wires, is being used to an increasing extent in the manufacture of electrical harnesses and harness sub-assemblies and heretofor, it has not been practical to use mass insertion techniques to insert the wires in a flat cable into terminals in a connector. A common type of flat cable comprises individual wires which are bonded to each other in side-by-side parallel coplanar relationship. Such cable may be produced either by extruding cable in its completed form or by bonding individual wires to each other. In either event, the wires in the cable must be separated from each other before they can be connected to terminals in a connector with the mass wire insertion techniques discussed above. The task of separating cable wires is burdensome and time-consuming and negates, to some extent, the advantages of using cable in harness manufacturing operations.

The present invention is directed generally to the achievement of methods and apparatus for connecting wires in a flat cable to terminals in a connector by the known mass insertion techniques and particularly, to methods and apparatus which avoid the necessity of preparing the cable in advance for the wire connecting operations.

The invention is thus directed to the achievement of a mass wire insertion apparatus for inserting a plurality of n wires into the wire receiving cavities of an electrical connector or the like, the cavities being in side-by-side relationship in a row. The apparatus is of the general type comprising a connector jig for holding the connector in a predetermined positioning and a wire locating jig proximate to the connector jig for locating the wires in side-by-side spaced-apart parallel relationship with each wire extending transversely of, and being in alignment with, one of the cavities. The invention is concerned with apparatus which is intended for use with wires in a flat cable, the wires being in side-by-side coplanar relationship with the center-to-center spacing of adjacent wires being less than the center-to-center spacing of adjacent cavities in the connector. An apparatus in accordance with the invention is particularly characterized in that the wire locating jig comprising a plurality of at least n-1 cable spreading and wire locating fingers, the fingers being in side-by-side relationship in a stack with the axes of the fingers extending transversely of the axes of the wires in a cable when the cable is located proximate to a connector in the connector jig with the cable axis extending transversely of the row of cavities in the connector. The fingers have convergently tapered free ends which are proximate to the cable and adjacent fingers in the stack have opposed cable spreading side surfaces which extend from the free ends of the fingers. The fingers and the cable are movable relatively towards each other so that the free ends of the fingers initially move between adjacent wires in the cable and thereafter, the side surfaces of the fingers spread the wires of the cable until the center-to-center spacing of adjacent wires in the cable is the same as the center-to-center spacing of adjacent cavities in the connector and the wires are in alignment with the cavities.

In accordance with a further embodiment, the fingers are normally in a packed condition in which the opposed side surfaces of adjacent fingers are substantially against each other and the center-to-center spacing between the free ends of adjacent fingers is equal to the center-to-center spacing of adjacent wires in the cable. The fingers are movable from the packed condition to a spread condition in which the opposed side surfaces of adjacent fingers are spaced apart by a distance equal to the diameters of the wires in the cable, the thickness of an individual finger plus the diameter of an individual wire being equal to the center-to-center spacing of adjacent cavities in the connector. The fingers are movable from the packed condition to the spread condition upon relative movement of each finger between adjacent wires in the cable whereby the wires are spread apart.

In accordance with a further embodiment, the fingers in the stack are in spaced-apart and fixed relationship to each other and the central pair of adjacent fingers in the middle of the stack have their free ends closest to the cable. The pair of corresponding fingers on each side of the central pair have their free ends spaced from the cable by a distance which is slightly greater than that of the central fingers and successive pairs located at increasing distance from the central pair have their free ends located at increasing distances from the cable.

Upon relative movement of the fingers towards the cable, the central pair of fingers straddle a central wire in the cable and spread cable laterally from the central wire. As successive pairs of corresponding fingers move against and partially through the cables, the wires on each side of the central wire are separated from the cable and spread.

In accordance with a further embodiment, the individual wires in a cable are spread apart by a method in which spreading fingers are moved against a cable located proximate to a connector and as the free ends of the fingers move through the cable, the wires in the cable are spread apart by the wedging action of the fingers.

DESCRIPTION OF THE DRAWINGS

FIG. 3 is an end view looking in the direction of the arrows 3—3 of FIG. 2.

FIG. 5 is a view similar to FIG. 3 but showing the positions of the parts immediately prior to spreading of wires in the cable.

FIG. 13 is a view similar to FIG. 12 showing the positions of the parts at the completion of the insertion operation.

PREFERRED EMBODIMENT OF THE INVENTION

In the following description, the principles of the invention are explained with reference to FIGS. 1–10 which show the essential parts of apparatus for practicing the invention. Thereafter, description is presented showing specific apparatus for connecting the wires in a cable to terminals in a connector which is part of a light bulb housing.

Figure 1:
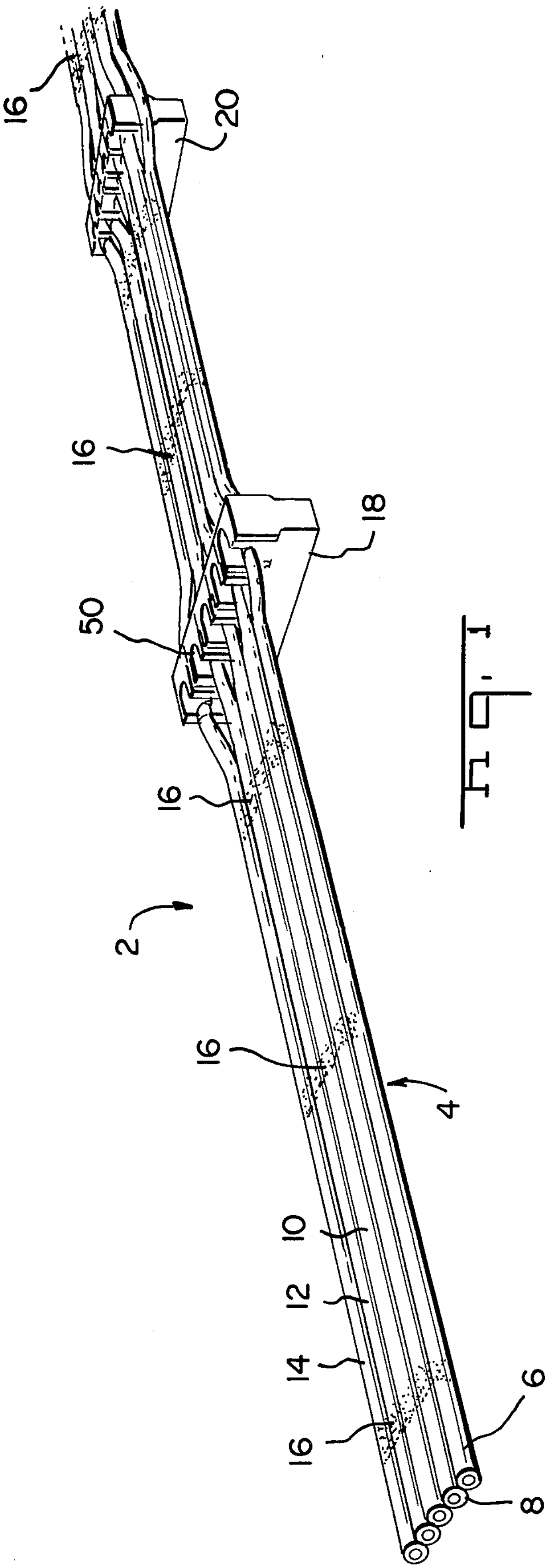
FIG. 1 is a perspective view of a section of an electrical harness having connectors installed thereon by the method and apparatus of the present invention.

FIG. 1 shows a portion of an electrical harness 2 comprising a flat cable 4 which is composed of side-by-side parallel conductors 6, 8, 10, 12, and 14. The conductors are held in the cable and bonded to each other by bands 16 of adhesive which extend across the wires in the cable so that the wires can be spread apart between the bands and the adhesive may be broken to spread the wires if necessary. Two connectors 18, 20 are installed on the cable, the connector 18 containing five terminals and the connector 20 being a four position connector so that the connector 6 extends around the endwall of the connector housing. FIGS. 2–7 show generally, an apparatus for installing the connector 20 on the cable.

Figure 2:
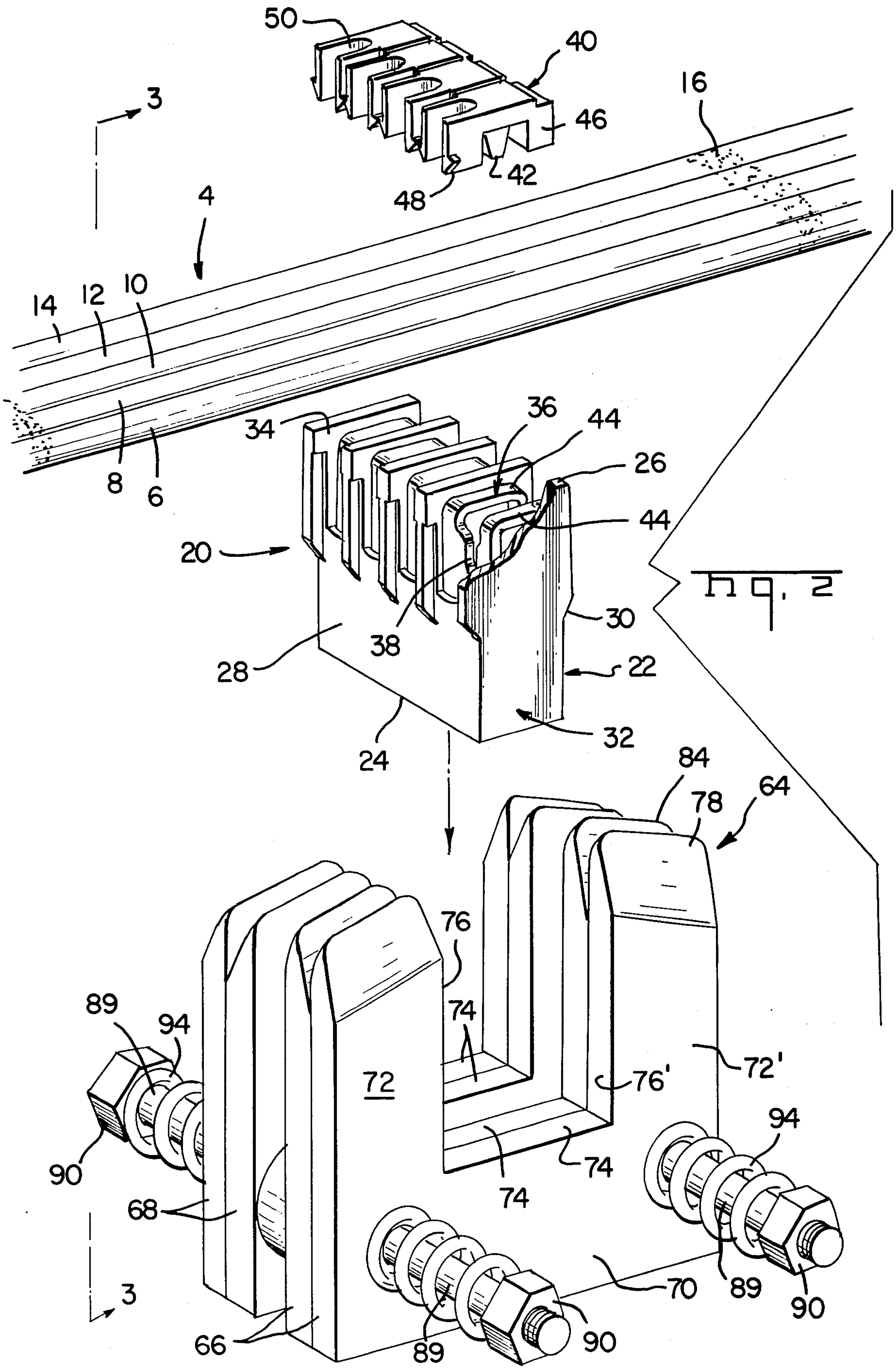
FIG. 2 is a perspective view showing a connector and wire jig assembly, a connector, a section of cable, and a connector closure or cover, the parts being exploded from each other in preparation for installation of the connector on the cable.

As shown in FIG. 2, the connector 20 comprises an insulating housing 22 having a lower or mating end 24, a wire receiving upper end 26, oppositely facing sidewalls 28, 30 and oppositely facing endwalls 32. Four cavities 34 extend through the housing from the end 26 to the end 24 and a terminal 36 is contained in each cavity. The terminals are of the type having spaced-apart plate-like sections connected to each other by connecting straps 44 and having wire receiving slots 38 so that a wire can be moved into the slots to establish contact between the wire and the terminal. The sidewalls 28, 30 are provided with openings adjacent to the end 26 so that the wires can pass entirely through and beyond the housing. The connector 20 is of the type having a cover or closure member 40 which is assembled to the housing at the end 26. The cover 40 has spaced-apart wire inserters 42 depending from its underside and also has depending sections 46, 48 on each side of the row of inserters 42. Slots 50 are provided in the cover to permit the wires to be dressed normally of the plane of the cover, if desired. The cover 40, when assembled to the housing, serves to push the wires into the slots 38 of the terminals and the cover is secured to the housing body by locking ears 52 (FIG. 3) on the ends of the cover which cooperate with locking shoulders 54 adjacent to the endwalls of the housing body. Additionally, barriers 56 extend from the sidewall 28 and barriers 58 are provided on the cover which have additional ears 60 on their lower ends that cooperate with shoulders 62 on the barriers 56.

An apparatus in accordance with the invention comprises a jig assembly 64, a pair of cable pushing members 98, 98', (FIG. 6), a pusher member 100 for the cover 40, and cable positioning means in the form of channel members 96, 96'.

The jig assembly 64 serves as a connector jig for positioning the connector and a wire jig for locating the wires in alignment with the terminals in the cavities 34 of the connector. The jig assembly 64 comprises a pair of U-shaped plates 66 and a second pair of U-shaped plates 68. The plates 66, 68 are substantially identical excepting for their upper ends, as described below. Each plate 66 thus has a web portion 70 and a pair of arms or fingers 72, 72'. The upper edges 74 of the plates above the web portion 70 form a supporting surface for the lower end 24 of the housing and the opposed edges 76, 76' of the arms 72, 72' also locate the housing in that they bear against portions of the sidewalls 28, 30. These surfaces thus function as the connector locating jig. The arms 72, 72' act as the fingers in a wire locating jig, each arm having an upper or free end 78 which is tapered to an edge 84. The upper ends of the arms 72, 72' are tapered leftwardly, as viewed in FIG. 5, while the upper ends of the arms or fingers of the plates 68 are tapered rightwardly. These opposite tapers on the fingers 66, 68 control the movement of the wires when the wires are split and spread as will be described below. The upper edges 84 of all of the arms are inclined downwardly and away from the centerline of the assembly. This inclination also facilitates movement of the free ends of the arms into the cable and spreading of the wires in the cable. A shown in FIGS. 5 and 7, adjacent fingers of the plates 66, 68 have opposed surfaces 86, 88 between which the individual wires are moved when the cable wires are spread to the positions of FIG. 7.

Figure 7:
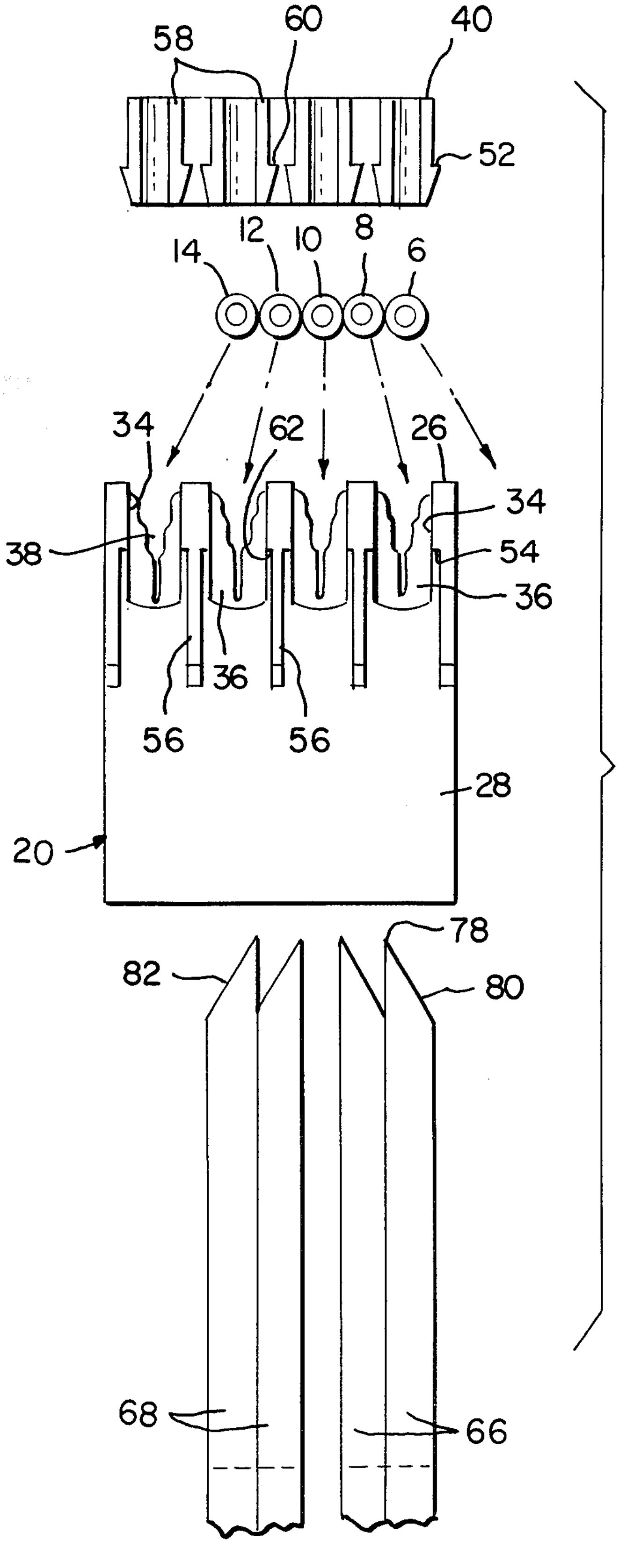
FIG. 7 is a view similar to FIG. 5 but showing the positions of the parts after the wires have been spread apart and inserted into the terminals in the connector.

The plates 66, 68 are mounted on rods 89 which extend through oversize openings in the plates adjacent to the lower edges thereof, so that the plates can move freely to spread positions shown in FIG. 7. Nuts 90 are threaded onto the ends of the rods and springs 94 are provided between the nuts and the surfaces of the outside plates of the stack so that the plates 66, 68 are resiliently biased to the positions shown in FIGS. 1, 3 and 5.

Spacers 92 are mounted on the rods 89 between the inner opposed plates 66, 68, the thickness spacers being slightly greater than the diameter of the central wire 10 in the cable. It will be apparent from FIG. 4 that this central wire 10 can therefore move downwardly and between the opposed surfaces of the inner plates 66, 68 and into the slots 38 of the adjacent terminal.

Figure 4:
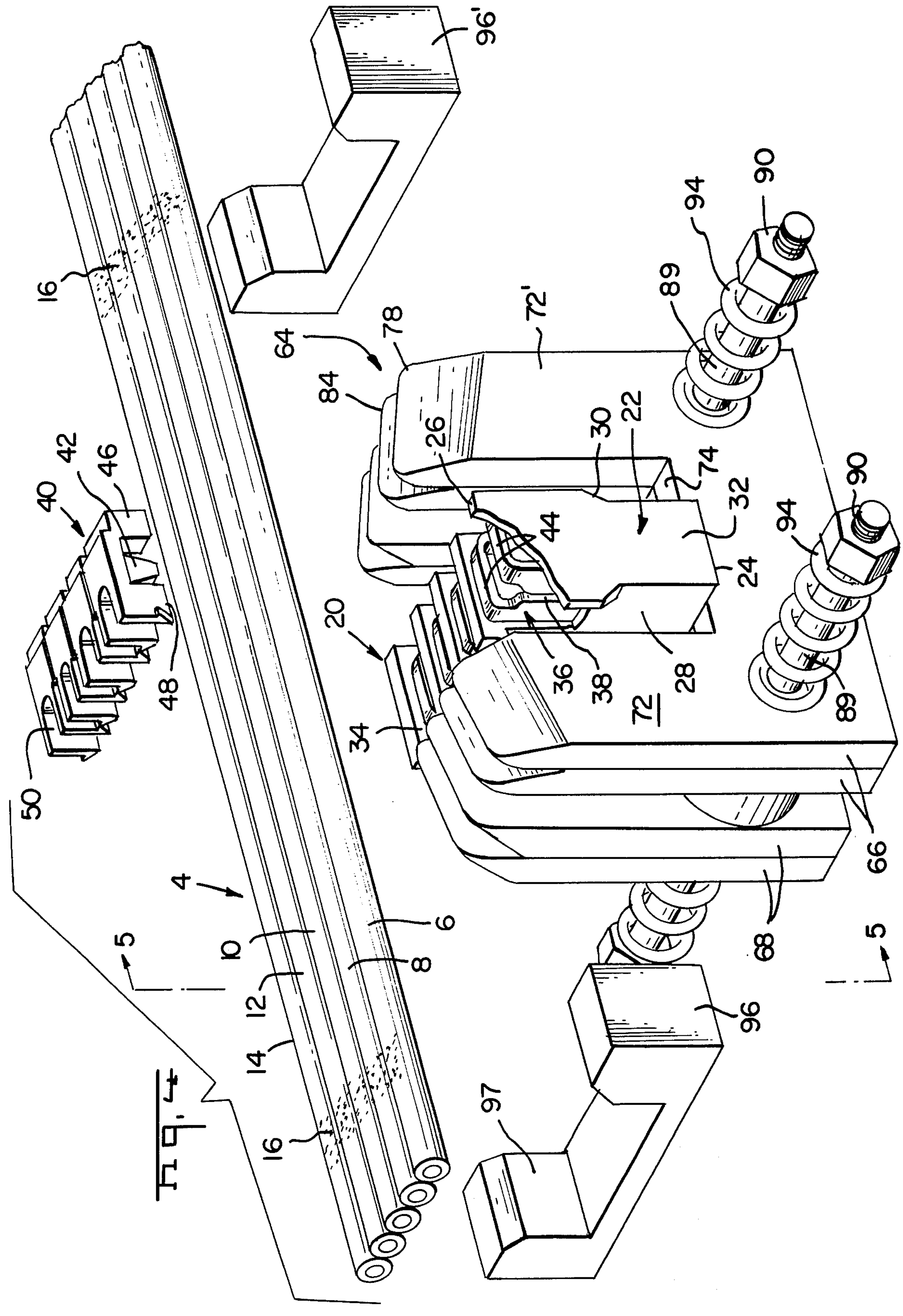
FIG. 4 is a view similar to FIG. 2 but showing the connector positioned in the connector jig.
Figure 7:
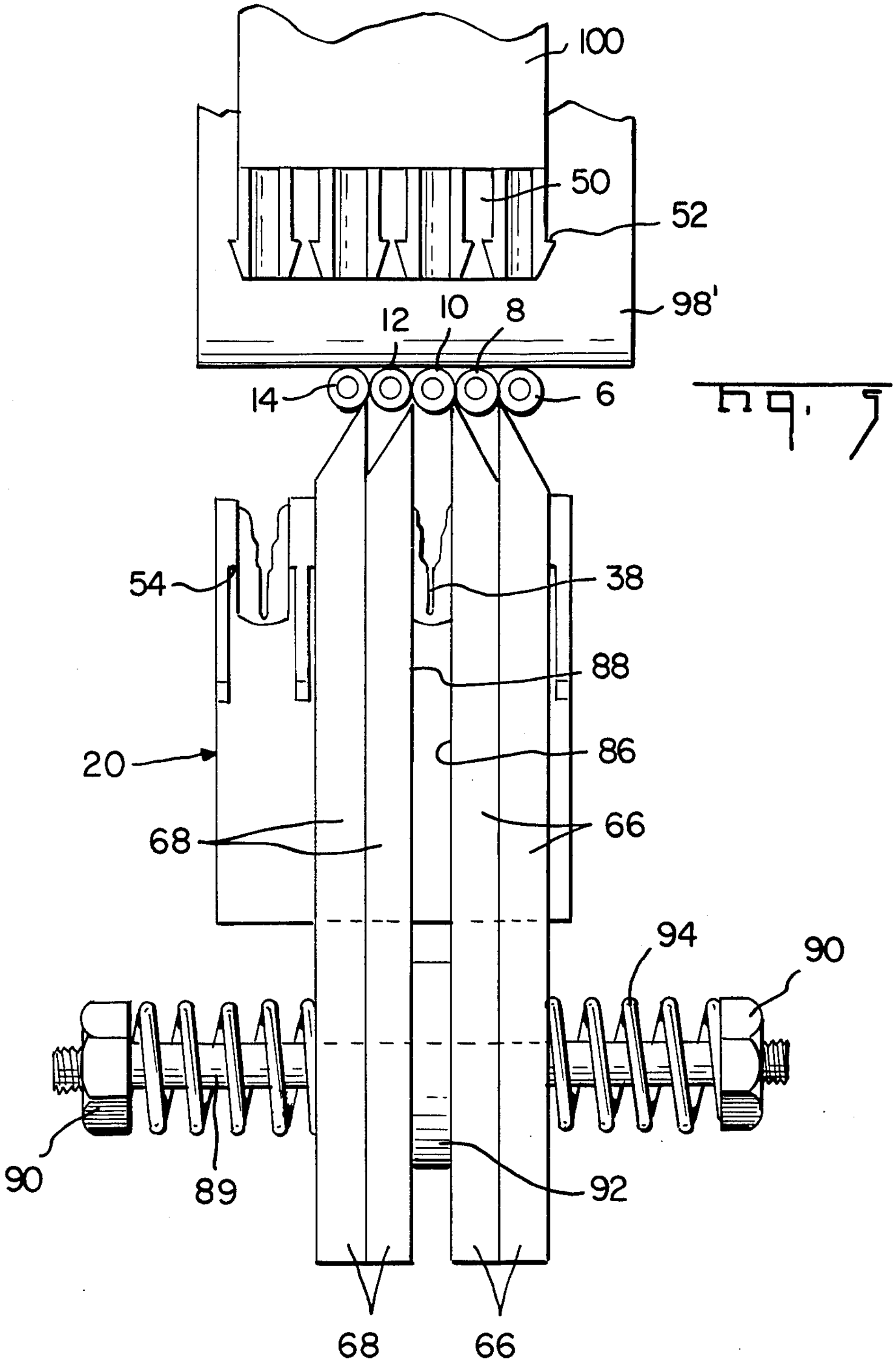
Figure 6:
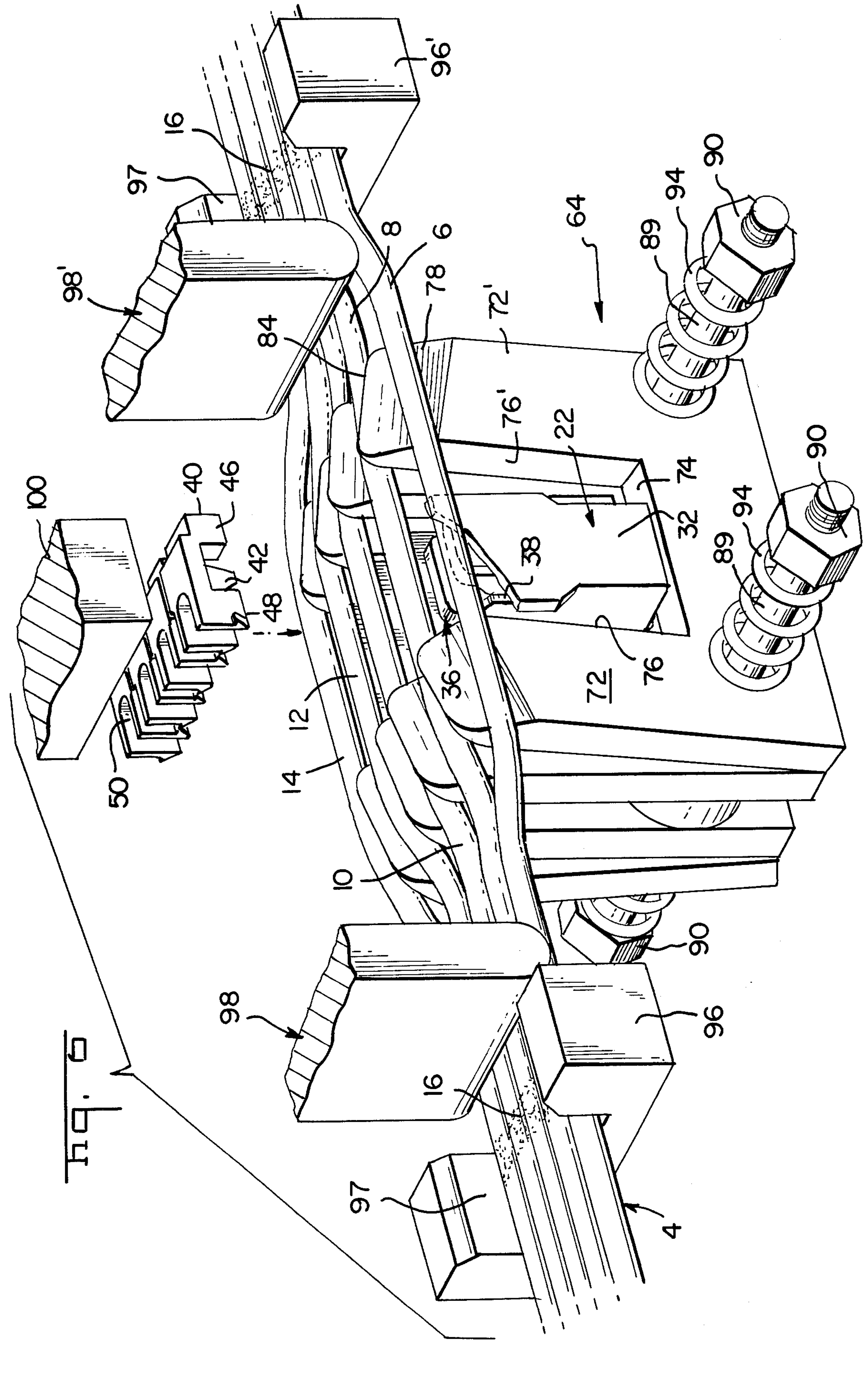
FIG. 6 is a view similar to FIG. 4 showing the positions of the parts after spreading of the wires in the cable and prior to assembly of the connector closure to the connector housing.
Figure 7:
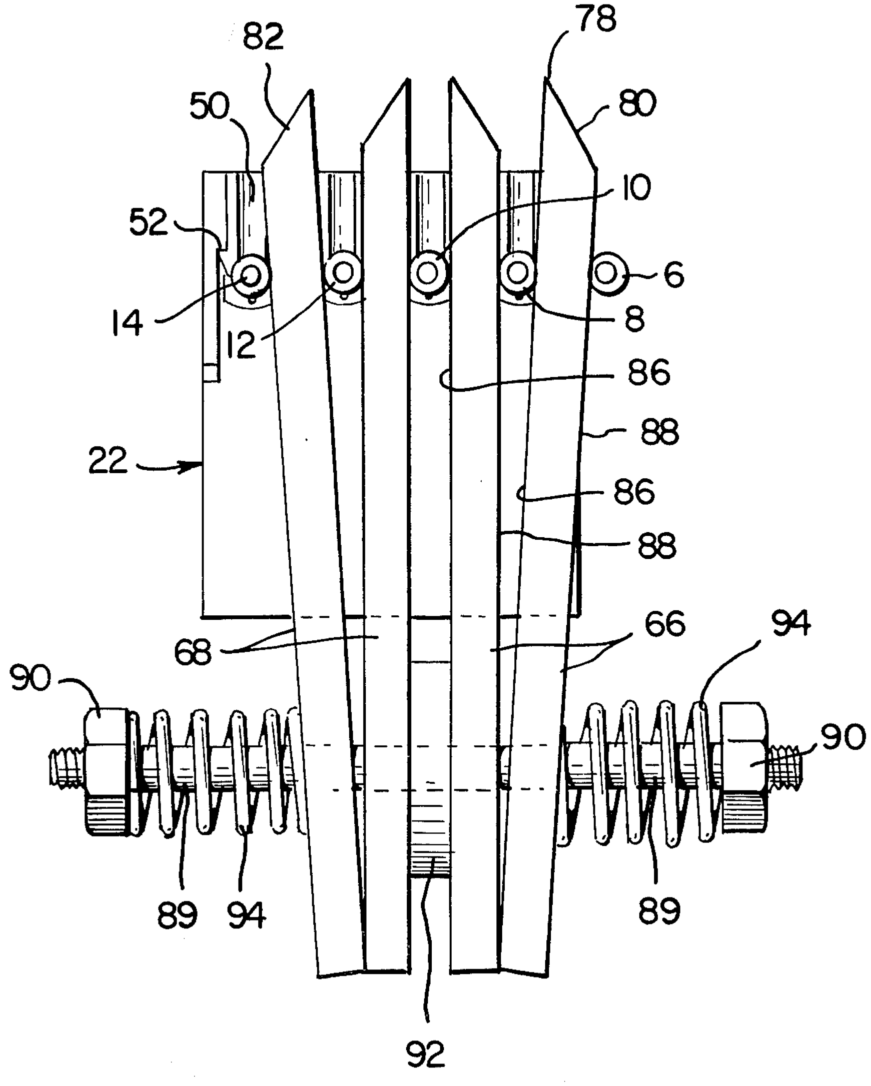

When the connector 20 is to be installed on the cable 4, the cable is located with its axis extending transversely of a connector positioned in the connector jig, that is, a connector held between the fingers 72, 72', as shown in FIGS. 3 and 4. Location of the cable is accomplished by means of channel-shaped cable positioning blocks 96, 96' which are recessed as shown at 97, to receive the cable. It is also desirable to clamp the cable at locations beyond the blocks 96, 96' and a suitable clamping means is described below with reference to FIG. 12. After the cable has been properly located, the cable pushing members 98, 98' are moved downwardly to the positions of FIG. 6 and during such movement, the cable will move relatively past the edges 84 of the free upper ends 78 of the stacks of fingers 72, 72'. Referring to FIG. 5, the wire 10 will move directly downwardly and be received in the slot 38 of the second terminal from the righthand end of the connector housing. The wire 8 will move downwardly and rightwardly over the inclined surface of the upper end of the fingers on the inner plate 66, while the conductor 12 will similarly move downwardly and leftwardly over the upper end of the fingers of the inner plate 68. The conductor 6 will be moved downwardly and rightwardly over the inclined upper end of the fingers on the outside plate 66 and the conductor 14 will move downwardly and leftwardly over the fingers on the outside plate 68.

As the wire 8, moves downwardly, it will spread apart the fingers of the plate members 66 and as the wire 12 moves downwardly, it will spread apart the fingers of the plate member 68, as shown in FIG. 7. The plate members will not remain parallel to each other as they are spread, but will tend to assume a fanlike configuration, as shown in FIG. 7, because of the fact that the rods 89 extend through oversize openings in the plates.

It will be apparent from FIGS. 5 and 7 then, that the wires cam the fingers from their close packed condition to their spread apart positions of FIG. 7 and in doing so, the wires themselves are spread apart until the wires 8, 10, 12, and 14 are in alignment with the cavities in the connector 2. The wire 6 is moved rightwardly beyond the righthand endwall 32 of the housing and is not connected to a terminal in the connector.

After the wires have been spread, the cover member 40 is pushed downwardly by the pusher 100 and the inserters 42 push the wires fully into the slots in the terminals. After spreading and before assembly of the cover, the wires are captured in the upper portions of the terminals and properly located in alignment with the terminals.

It will be understood that the essential structural elements required for the practice of the invention as illustrated in FIGS. 2–7, can be incorporated into a variety of cable making machines, as described above in U.S. Pat. Nos. 4,043,034 and 4,235,015, and they can also be incorporated into the tooling used to manufacture harnesses on a harness board, as described in U.S. Pat. No. 4,194,276. The fingers can, of course, be entirely separate from, but adjacent to, the connector jig and an embodiment is described below in which that arrangement is used. The elements of the apparatus shown in FIGS. 2–7 would ordinarily be mounted on a part of a press device designed to carry out the particular type of harness making operation being practiced.

While two stacks of fingers are provided in the jig assembly 64 of the embodiment of FIGS. 2–7, it is entirely practical to spread the wires by the use of only a single stack of wire spreading fingers and an embodiment having only a single set of fingers is shown and described below.

Figure 8:
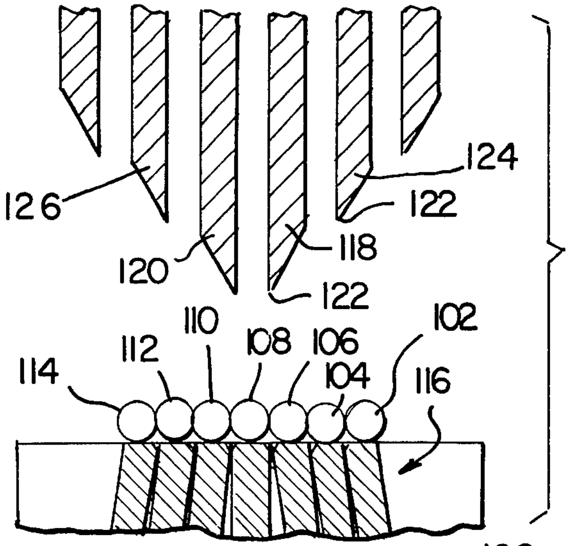
FIG. 8 is a semi-diagrammatic view showing an alternative arrangement of the fingers.
Figure 9:
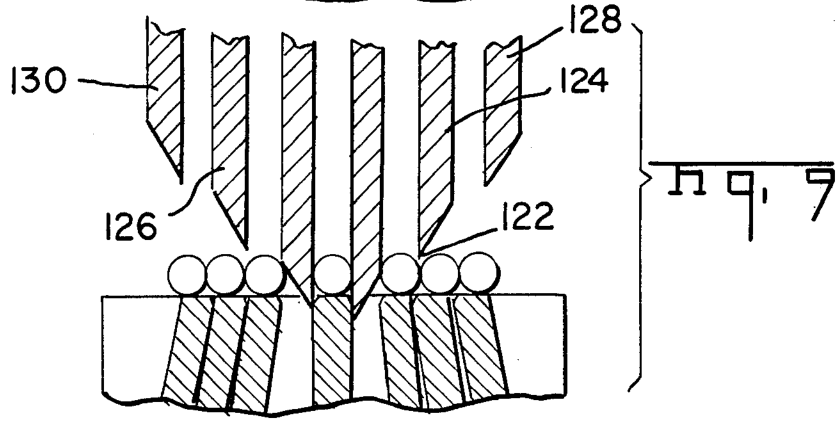
FIGS. 9 and 10 have views similar to FIG. 8 showing the positions of the parts at successive stages of the cable spreading operation.
Figure 10:
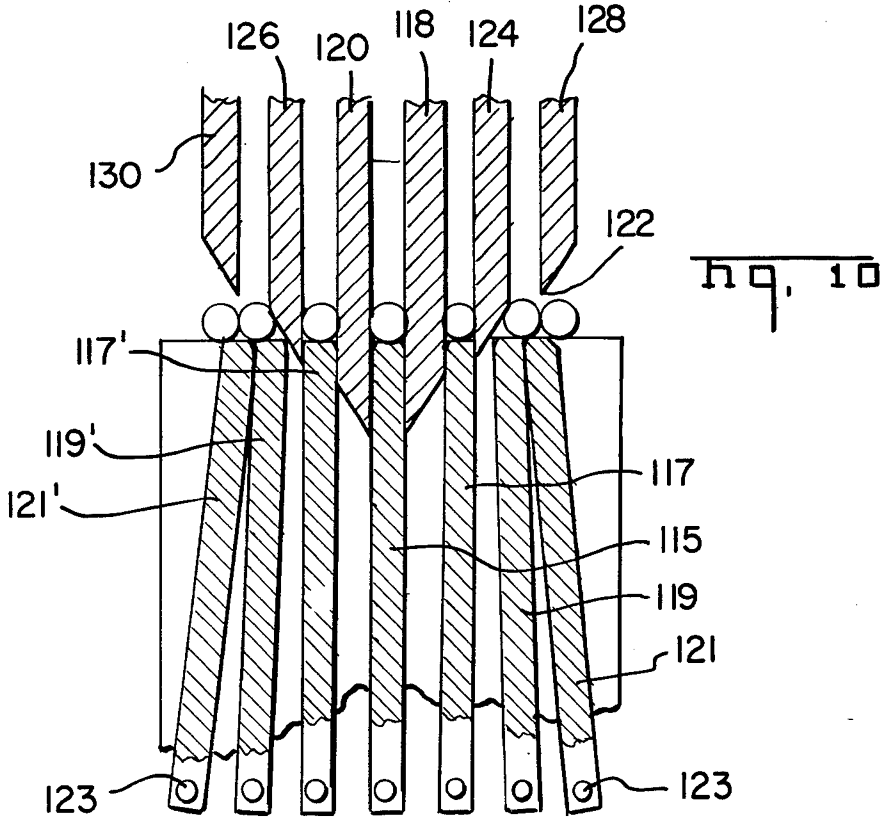

As an alternative to having the fingers movable from a closely packed condition to a spread-apart condition when the cable is spread apart as described above, it is also possible to provide the fingers in fixed positions as shown in FIGS. 8–10. In this embodiment, the cable has conductors 102, 104, 106, 108, 110, 112, and 114 which are bonded to each other as previously described. The cable is supported on a support assembly 116 having a surface composed of the upper ends of plates 115, 117, 117', 119, 119', and 121, 121'. The plates are all mounted on rods 123 which extends through their lower portions and in the plane of the plates. The plates to the right of the center plate 115 are inclined leftwardly towards the center plate, while the plates to the left of the center plate 115 are inclined rightwardly. These plates are capable of moving from their inclined positions of FIG. 8 to positions in which they approach vertical orientations, as shown in FIG. 10.

The stack of spreading fingers comprises an associated pair 118, 120 of central fingers which have lower ends 122 that are relatively close to a cable supported on the support assembly 116. The intermediate associated pair of fingers 124, 126 are spaced from the fingers 118, 120 respectively, and have lower ends or free ends 122 which are spaced from the cable by a distance greater than the free ends of the central fingers 118, 120. The outermost pair of fingers 128, 130, in turn, have lower free ends which are spaced a still further distance from the cable.

All of the spreading fingers of the embodiment of FIG. 8 are fixed to a suitable reciprocable head and they move in unison from the position of FIG. 8 to the position of FIG. 10. Also, the space between adjacent fingers is sufficient to receive one of the individual wires of the cable and the center-to-center space of adjacent fingers is equal to the center-to-center spacing of the terminals in the connector.

In the practice of the invention as illustrated in FIGS. 8–10, the fingers are moved downwardly from the position of FIG. 8 until the central fingers 118, 120 straddle the central conductor 108 and as these two central fingers move into the cable, the conductors 102, 104 and 106 are displaced rightwardly while the conductors 110, 112 and 114 are displaced leftwardly as shown in FIG. 9. Upon further downward movement of the fingers, the finger 124 will move between the wires 104, 106 and the finger 126 will move between the wires 110, 112. As the result, the wires 104 and 102 will be moved rightwardly a further distance and the conductors 112, 114 will be moved leftwardly as shown in FIG. 10. It will be apparent from FIG. 10 then, that upon still further downward movement of the fingers, the wires 102 and 114 will be spread from the wires 104 and 112 and the individual wires of the conductors will all have been spread to the extent required. Downward movement of the fingers is permitted in this embodiment by virtue of the fact that the plates which comprise the support 116 can move apart, as shown in FIG. 10.

Figure 11:
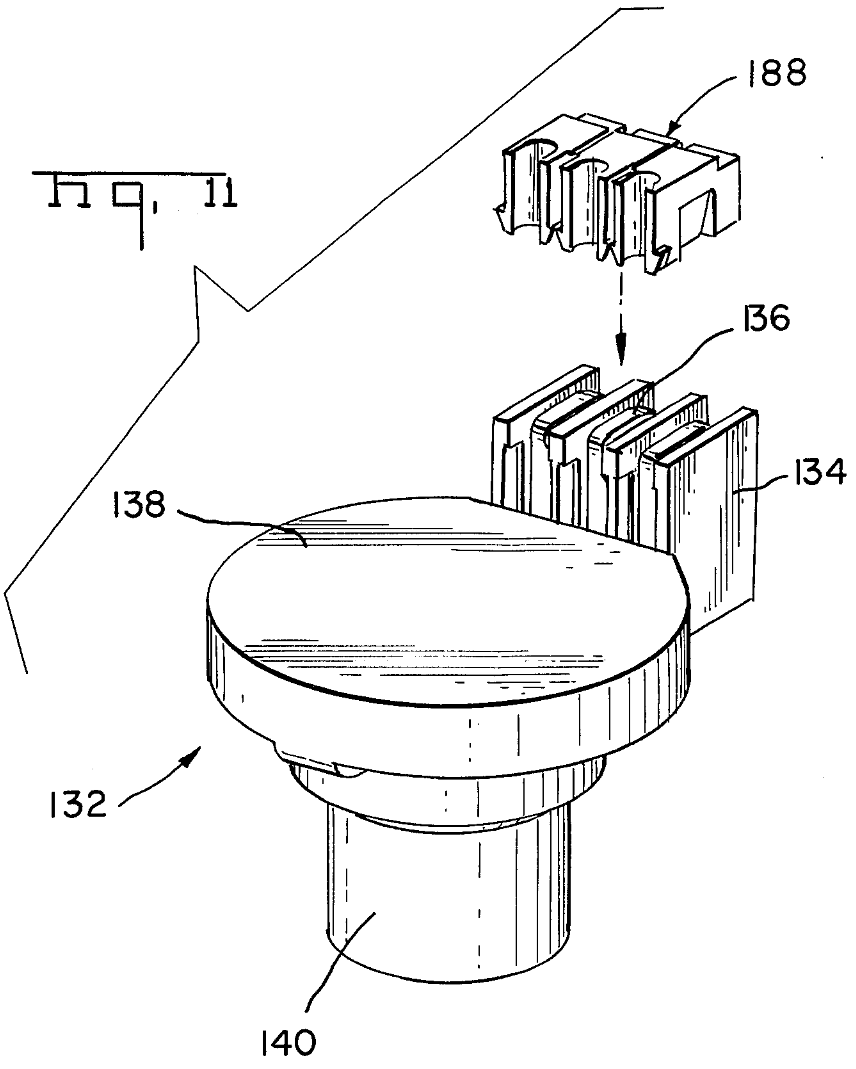
FIG. 11 is a perspective view showing an automotive bulb socket having an integral electrical connector.

FIGS. 12–15 show an apparatus in accordance with the invention for installing a lamp socket 132, FIG. 11, on a cable 133 having six wires, three of which are to be connected to terminals in the lamp socket. The lamp socket has a socket body 140 having an integral back wall 138 at one end of which there is provided an integral connector 134 having three side-by-side cavities 136. The connector 134 is generally similar to the connectors 18, 20 excepting that it is provided on the lamp socket and it will be understood that the terminals in the cavities 136 have contact portions that extend into the socket body and which contact a bulb inserted into the socket body. A lamp socket as shown at 132 will be provided on an automotive harness, where required, along with other electrical connectors.

Figure 12:
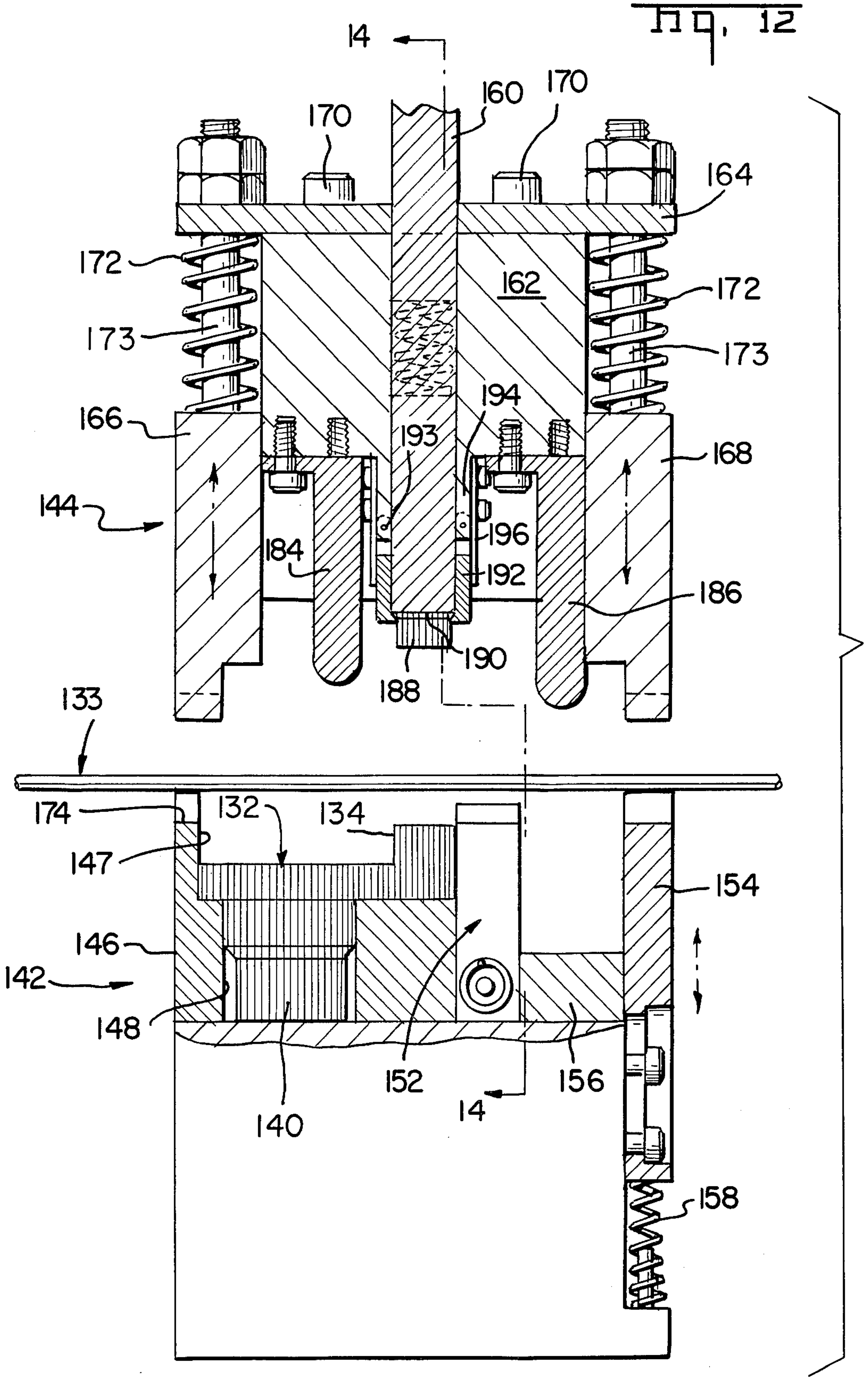
FIG. 12 is a sectional side view of an apparatus for spreading the wire of a cable and inserting selected wires in the cable into the terminals in the connector on the bulb socket of FIG. 11, this view showing the positions of the parts prior to the insertion operation.
Figure 17:
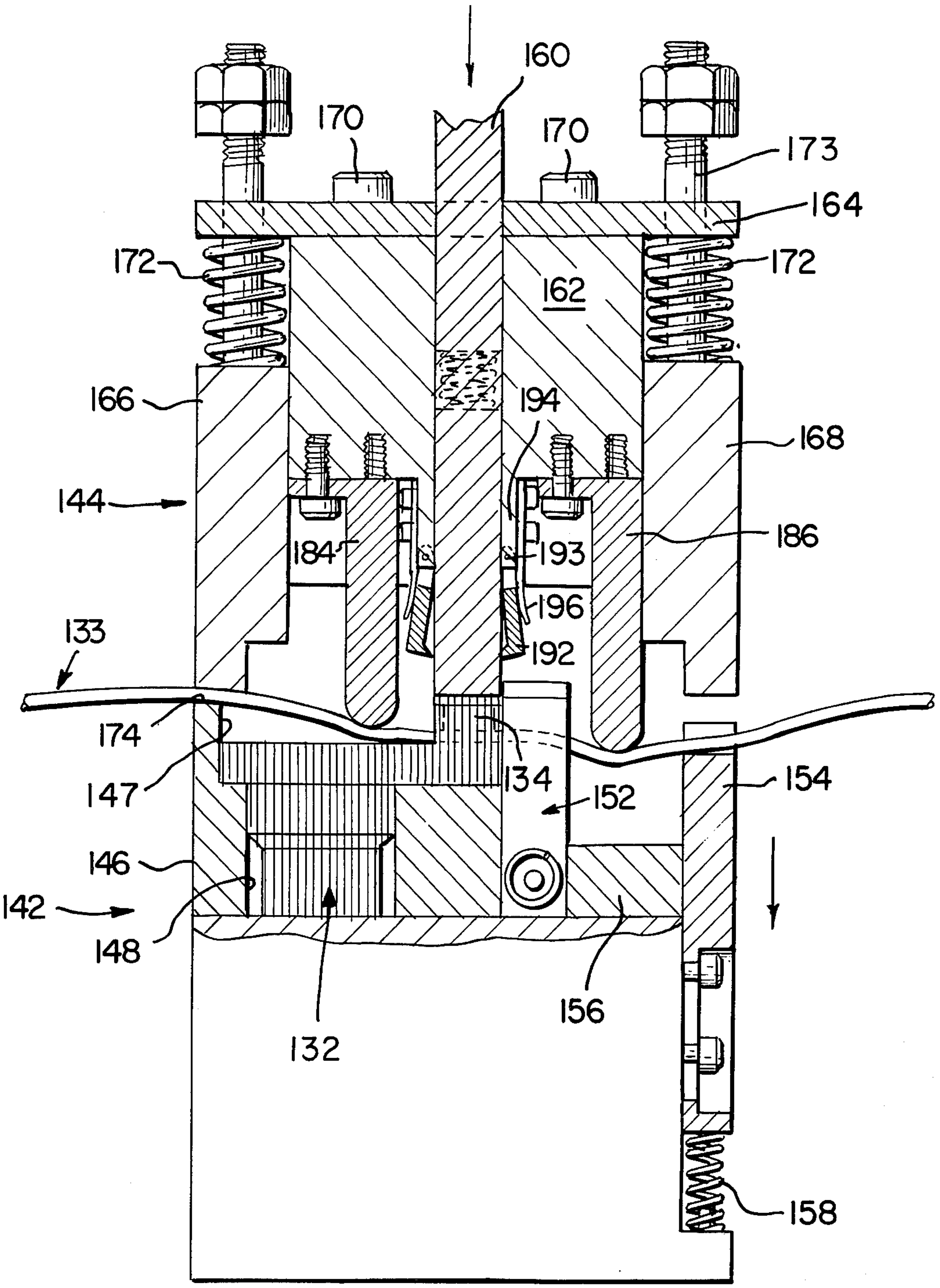

The apparatus of FIG. 12 comprises a lower insertion tooling assembly 142 and an upper tooling assembly 144. The lower assembly 142 may be mounted on the platen of a press and the ram 160 of the upper assembly may be connected to the press ram so that the upper assembly can be moved downwardly from its position shown in FIG. 12.

Figure 14:
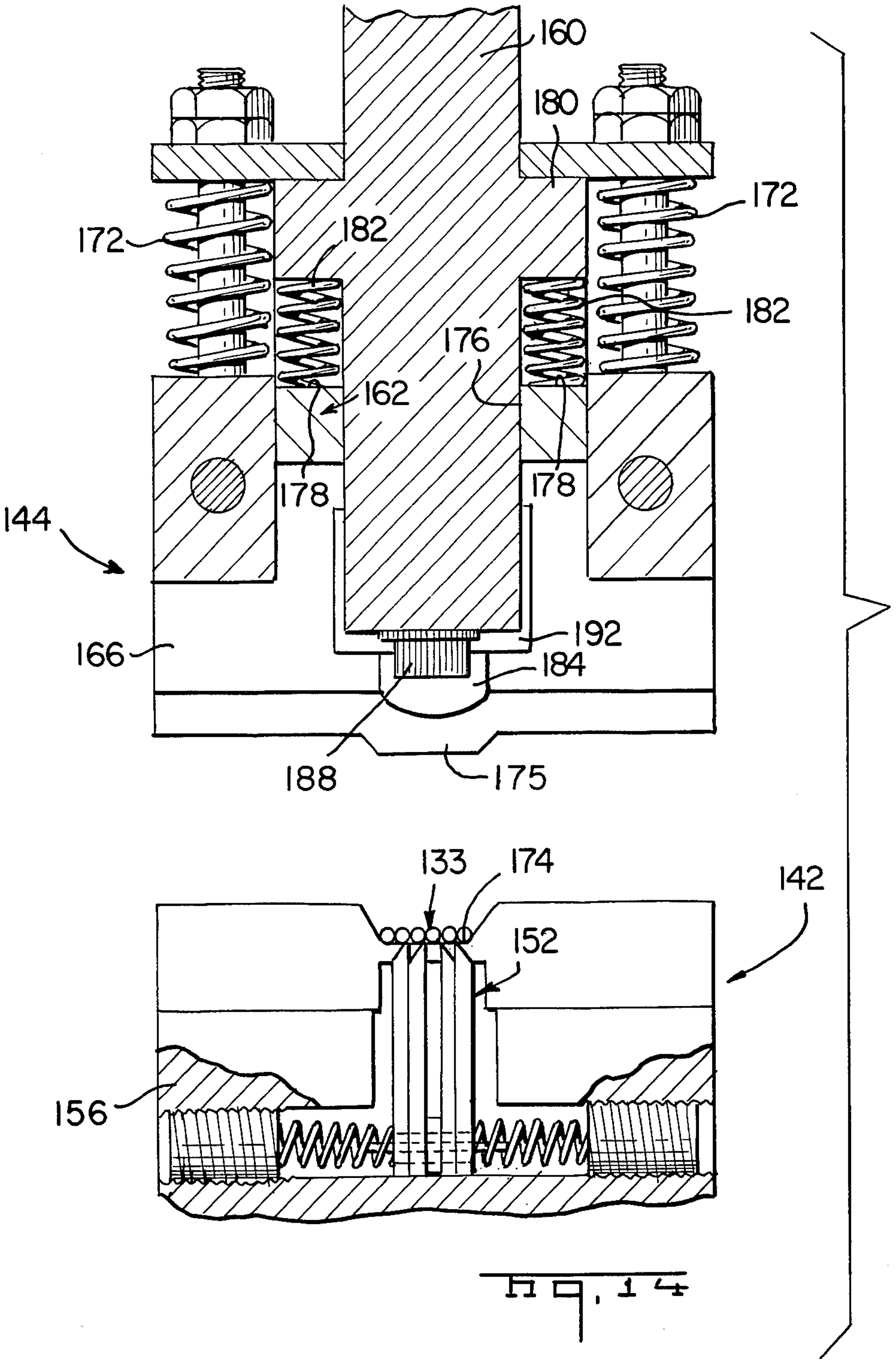
FIG. 14 is a view taken along the lines 14—14 of FIG. 12.

The lower assembly 142 comprises generally a tooling support block 146 having a recess 147, 148 adjacent to the lefthand end as viewed in FIG. 12 which receives the lamp socket 132. The connector 134 of the lamp socket is located against the lefthand side of a wire jig assembly 152 which comprises a single stack of fingers rather than two stacks of fingers as in wire jig assembly shown at 64 in FIG. 2. FIG. 14 shows the manner of mounting the springs for the wire jig in the tooling block 146. The wire jig assembly 152 is adapted to spread the six-wire cable and located three of the wires of the cable in alignment with three cavities of the connector. The recess 147, 148 thus serves in this embodiment as the connector jig for locating the connector adjacent to the wire jig assembly. On its righthand side, as viewed in FIG. 12, a lower cable clamp 154 is provided which is supported by a spring 158 so that this cable clamp can move downwardly from the position shown in FIG. 12. Cable clamp 154 is separated from the wire jig assembly 152 by a spacer block 156 which provides clearance for the righthand upper cable pusher 186.

The upper tooling assembly 144 comprises a ram 160 which is coupled to a suitable actuator, such as a ram of a press or a pneumatic piston/cylinder. The upper assembly further comprises a carrier block 162, a plate 164, a lefthand upper wire clamp 166, and a righthand upper wire clamp 168, as viewed in FIG. 12. The carrier block 162 and the wire clamps 166, 168 are carried by the plate 164 and secured thereto by fasteners 170. The wire clamps comprise movable clamping members which are spring loaded by springs 172 thereby to permit over-travel of the ram 160 as described below. The left-hand wire clamp 166 moves against clamping surface portions 174 of the block 146 and the righthand wire clamp 168 moves against the lower righthand wire clamp 154 so that the cable is clamped on each side of the lamp socket.

Carrier block 162 has a central opening 176 through which the ram 160 extends and which permits relative movement of the ram with respect to the carrier block. The opening 174 extends to opposite sides 163 of the block 162 and the block has upwardly laterally facing support surfaces 178 at its lower end adjacent to the sides 163. The ram 160 has laterally extending ears 180 which are opposed to, and in alignment with, surfaces 178. Springs 182 are provided between the surfaces 178 and the ears 180, these springs 182 being relatively stiff as compared to the springs 172, so that they will not be compressed until there is some compression of the springs 172.

Figure 15:
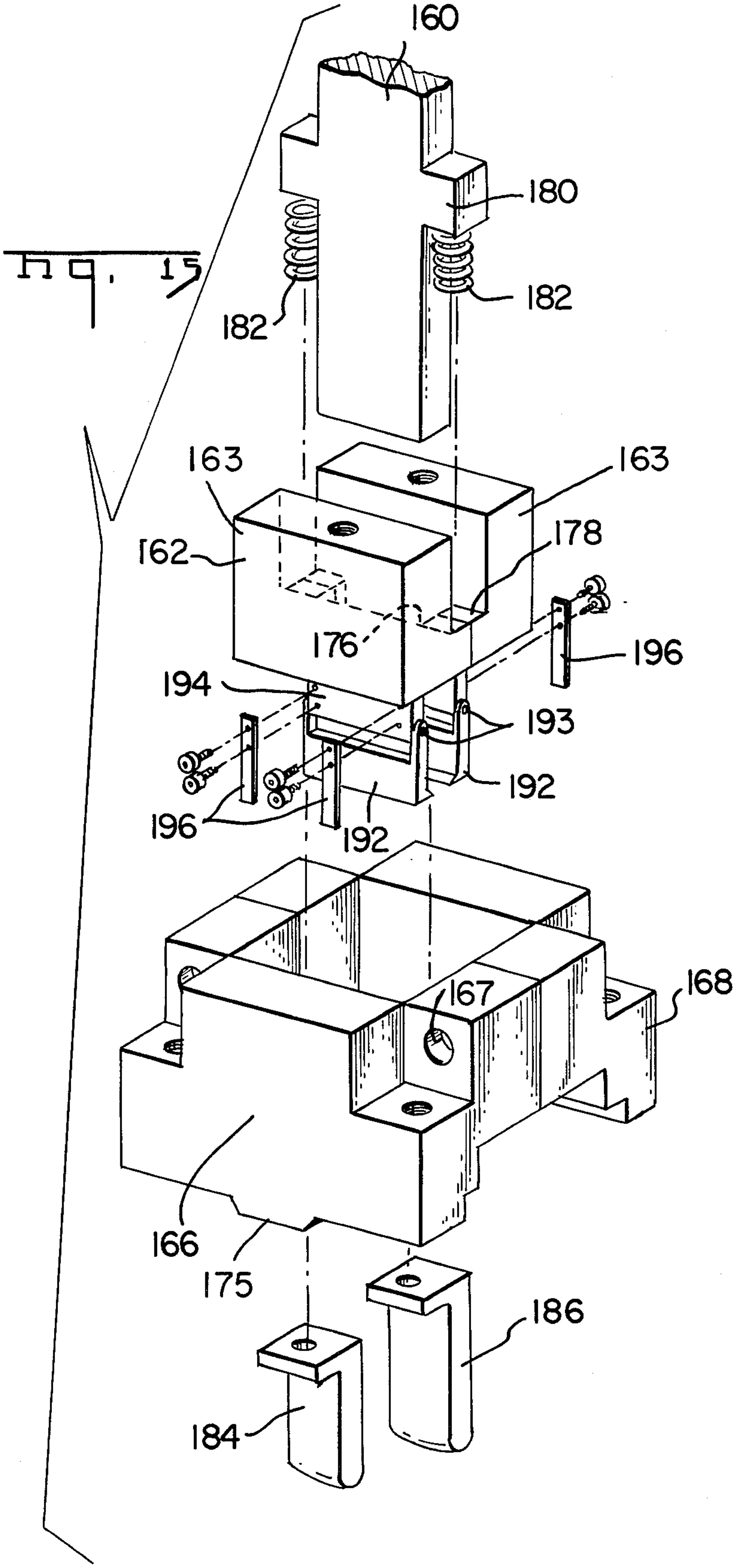
FIG. 15 is a perspective exploded view of the principal elements of the upper tooling portion of the apparatus of FIG. 12.

As shown best in FIG. 15, the carrier block 162 is formed of two substantially identical halves which are surrounded by the cable clamps 166, 168. These halves of the carrier block are bolted to the plate 164 (which is omitted from FIG. 15 for reasons of clarity) and are thereby held in assembled relationship. The cable clamps are fastened to each other by fasteners which extend through opening 167 and serve as a guide for the block 162. The springs 172, FIG. 12, surround guide rods 173 which are threaded into the cable clamps and which extend slideably through openings in the plate 164. The wires in the cable are clamped by projecting portions 175 of the cable clamps 166, 168.

Left and righthand cable pushers 184, 186 are secured to the downwardly facing surface of the carrier block 162 and move against the cable when the upper tooling assembly is moved downwardly from the position of FIG. 12. The cable pusher 186 extends downwardly beyond the lower end of the cable pusher 184 thereby to push the cable into the cavities in the connector 134. The function of the cable pushers 184, 186 is essentially the same as that of the cable pushers 98, 98' shown in FIG. 6.

The cover 188 for the lamp socket connector 134 is releasably held against the lower end 190 of the ram 160 by holding fingers 192 which are pivotally connected at 193 to spaced-apart extensions 194 of the block 162. The holding fingers are biased to the position shown in FIG. 12 by leaf springs 196 which are secured to the outwardly facing surfaces of the extensions 194. The arrangement is such that when the cover 188 is being pushed into the connector, the ram 160 will move relative to the block 162 and the extensions 194 and the cover will be pushed from the fingers 192.

In use the cable 133 is positioned beween the upper and lower tooling as shown in FIG. 12, a lamp socket is placed in the recess 147, 148, and a cover is placed against the end 190 of the ram 160. The ram 160 is then moved downwardly and the entire upper tooling assembly 144 moves as a unit until the cable is clamped by the upper and lower clamping members 166, 168, 174, and 154. Thereafter, the ram 160 moves downwardly relative to the block 162 and the cover 188 is pushed into the connector. During initial downward movement of the upper tooling assembly 144, the cable is moved past the upper end of the cable spreading fingers of the wire jig assembly 152 and the individual wires of the cable are aligned with the cavities into which they are to be inserted.

It is desirable to have the lower wire clamp 154 on the righthand side of the apparatus spring loaded as shown, in order to permit some relative movement of the cable relative to the wire clamp as the cable wires are pushed between the fingers of the jig assembly 152.

The cable clamping arrangement shown in FIG. 12 can be used with the apparatus shown in FIGS. 1-8; alternatively, other types of cable clamps can be used as dictated by the circumstances under which the invention is practiced.

The embodiment of FIG. 12 demonstrates that under some circumstances, a wire jig can be used compressing only one stack of fingers rather than the two stacks as shown in the embodiment of FIGS. 2-7. It will also be apparent that the connector jig can take a wide variety of forms which will be determined by the circumstances under which the invention is practiced and the type of cable making operations that are being carried out.

Although the cables described above comprise side-by-side wires which are bonded to each other at spaced intervals, the invention can be practiced with cables composed of wires which are continuously bonded to each other. The edges of the fingers can be sharpened so that they will cut into the bonding material between adjacent wires if required, and the wires will be separated by tearing of the bonding material as the fingers pass through the cable. The invention can also be practiced with cables composed of wires in side-by-side relationship which are not bonded to each other. The cable can be produced by feeding the discrete wires to a terminal installing station and holding the wires in suitable guides which maintain the wires in side-by-side relationship. If desired, bundle tie devices can be placed on the wires at selected locations between the connectors.

The term "cable" as used in this specification and in the appended claims is intended to refer to the wires which are connected to the terminals in a connector and when the word is used in that context, the "cable" may be a portion of another cable containing a greater number of wires. For example, the cable which is connected to the connector 20 of FIG. 1 consists of the wires 8, 10, 12, and 14 and is a part of the cable 4 which contains, in addition, the wire 6.

What is claimed is:

1. A method of connecting wires to terminals, the wires being in coplanar side-by-side parallel relationship in a cable, the terminals being in cavities in an electrical connector, the cavities being in side-by-side relationship in a row, the center-to-center spacing of adjacent wires in the cable being less than the center-to-center spacing of adjacent cavities in the connector, the method being characterized in that:

the cable is positioned proximate to the row of cavities in the connector with the axes of the wires in the cable extending substantially normally of the axes of the cavities and with the axis of a central wire in the cable substantially intersecting the axis of a central cavity in the row, the wires on each side of the central wire are spread in opposite directions laterally of their axis and in the plane of the cable, the spreading step being carried out by moving relatively a stack of side-by-side spreading fingers towards and through the cable, the spreading fingers having convergently tapered free ends which move between adjacent wires in the cable so that upon further relative movement of the fingers through the cable, the wires are spread apart until the center-to-center spacing of adjacent wires is equal to the center-to-center spacing of adjacent cavities and the axes of the individual wires substantially intersect the axes of the cavities and the wires are thereafter connected to the terminals by moving the wires laterally of their axes, normally of the plane of the cable and into the cavities.

2. A method of connecting wires to terminals as set forth in claim 1 characterized in that the cable is moved towards the free ends of the fingers and the individual wires are moved between adjacent fingers.

3. A method of connecting wires to terminals as set forth in claim 2 characterized in that the fingers in the stack are normally in a compacted condition with the spacing between the free ends of adjacent fingers being equal to the spacing between adjacent wires in the cable, and the wires in the cable spread the fingers as the wires move between adjacent fingers.

4. A mass wire insertion apparatus for inserting a plurality of n wires, where n is at least three, into the wire-receiving cavities of an electrical connector or the like, the cavities being in side-by-side relationship in a row, the apparatus being of the type comprising a connector jig for holding the connector in a predetermined position and a wire locating jig proximate to the connector jig for locating the wires in side-by-side spaced-apart parallel relationship with each wire extending transversely of, and being in alignment with, one of the cavities, the apparatus being intended for use with wires in a flat cable, the wires in the cable being in side-by-side coplanar relationship with the center-to-center spacing of adjacent wires being less than the center-to-center spacing of adjacent cavities in the connector, the apparatus being characterized in that:

the wire locating jig comprises a plurality of at least n-1 cable spreading and wire-locating fingers, the fingers being in side-by-side relationship in a stack with the axes of the fingers extending transversely of the axes of the wires in a cable when the cable is located proximate to a connector in the connector jig with the cable axis extending transversely of the row of cavities in the connector, the fingers having convergently tapered free ends which are proximate to the cable, adjacent fingers having opposed cable spreading side surfaces which extend from the free ends, the fingers and the cable being movable relatively towards and past each other so that the free ends of the fingers move completely through the cable until they are between adjacent wires in the cable and the side surfaces of the fingers spread the wires of the cable during movement until the center-to-center spacing of adjacent wires in the cable is the same as the center-to-center spacing of adjacent cavities in the connector and the wires are in alignment with the cavities, the spread wires being in co-planar relationship with the wires in the cable whereby, portions of the wires of the cable which are in the vicinity of a connector held in the connector locating jig are spread apart so that the individual wires are each located in alignment with one of the cavities in the connector, and the individual wires can thereafter be moved laterally of their axes and into the cavities of the connector.

5. A mass wire insertion apparatus as set forth in claim 4 characterized in that the fingers are normally in a packed condition in which the opposed side surfaces of adjacent fingers are substantially against each other and the center-to-center spacing between the free ends of the adjacent fingers is equal to the center-to-center spacing of adjacent wires in the cable, the fingers being movable to a spread condition in which the opposed side surfaces of adjacent fingers are spaced apart by distances equal to the diameters of the wires in the cable, the thickness of an individual finger plus the diameter of a wire being equal to the center-to-center spacing of adjacent cavities in the connector, the fingers being movable from the packed condition to the spread condition upon relative movement of each finger between adjacent wires in the cable whereby the wires are spread apart until the center-to-center spacing of adjacent wires is the same as the center-to-center spacing of adjacent cavities.

6. A mass wire insertion apparatus as set forth in claim 4 characterized in that the fingers are in spaced-apart and fixed relationship to each other, the central pair of adjacent fingers in the middle of the stack of fingers having their free ends closest to the cable and on each side of a central conductor in the cable, the first pair of corresponding fingers in the stack which are on each side of and adjacent to the central pair having their free ends spaced from the cable by a distance which is greater than that of the central fingers, successive pairs having their free ends spaced from the cable at increasing distances, the center-to-center spacing of the fingers being equal to the center-to-center spacing of the cavities in the connector whereby upon relative movement of the fingers towards the cable, the central pair of fingers straddle a central wire and spread the cable laterally from the central wire, and as successive pairs of corresponding fingers move through the cable, the wires on each side of the central wire are spread.

7. A mass wire insertion apparatus as set forth in either of claims 5 or 6 characterized in that a cable support is provided for supporting the cable with the wires in the cable extending transversely of the axes of the fingers and transversely of a connector in the connector jig.

8. A mass wire insertion apparatus as set forth in claim 6 characterized in that a cable support is provided for supporting the cable with the wires in the cable extending transversely of the axes of the fingers and transversely of a connector in the connector jig, the fingers being movable towards the cable to spread the wires in the cable.

9. A mass wire insertion apparatus as set forth in claim 5 characterized in that the fingers have supported ends which are remote from the free ends, the fingers being movably supported at their supported ends for movement between the packed condition and the spread condition.

10. A mass wire insertion apparatus as set forth in claim 9 characterized in that springs are provided which resiliently bias the fingers to the packed condition.

11. A mass wire insertion apparatus as set forth in claim 10 characterized in that the fingers are supported on a rod-like member which extends through oversize openings in the fingers at their supported ends, the springs being provided on the rod-like member.

12. A mass wire insertion apparatus as set forth in either of claims 5 or 6 characterized in that a single set of fingers is provided adjacent to the connector jig.

13. A mass wire insertion apparatus as set forth either of claims 5 or 6 characterized in that the wire-locating jig comprises two stacks of cable-spreading and wire-locating fingers, the connector jig being between the two stacks of fingers.

14. A mass wire insertion apparatus as set forth in either of claims 9 or 11 characterized in that the wire-locating jig comprises two stacks of fingers, the connector jig being between the two stacks of fingers.

15. A mass wire insertion apparatus as set forth in claim 14 characterized in that the apparatus comprises a stack of U-shaped members, the arms of each U-shaped member each being a finger in one of the stacks.

16. A mass wire insertion apparatus as set forth in claim 15 characterized in that the webs of the U-shaped members serve as a connector-supporting portion of the connector jig.

17. A mass wire insertion apparatus as set forth in either of claims 9 or 11 characterized in that a cable pushing means is provided for pushing the cable laterally of its axis towards and past the free ends of the fingers.

18. A mass wire insertion apparatus as set forth in claim 17 characterized in that a wire pusher is provided for pushing the spread-apart wires of the cable laterally of their axes and into the cavities of a connector held in the connector jig.

* * * * *